(12) United States Patent
Russo et al.

(10) Patent No.: US 9,051,439 B2
(45) Date of Patent: Jun. 9, 2015

(54) HYDROCARBON FLUID COMPATIBLE MICRONIZED POLYMERS

(71) Applicant: SHELL OIL COMPANY, Houston, TX (US)

(72) Inventors: Joseph Michael Russo, Katy, TX (US); Timothy Michael Shea, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 9 days.

(21) Appl. No.: 13/663,214

(22) Filed: Oct. 29, 2012

(65) Prior Publication Data

US 2013/0108870 A1 May 2, 2013

Related U.S. Application Data

(60) Provisional application No. 61/553,586, filed on Oct. 31, 2011.

(51) Int. Cl.

| | | |
|---|---|---|
| C10L 1/182 | (2006.01) | |
| C10L 1/232 | (2006.01) | |
| C08F 120/06 | (2006.01) | |
| C10M 105/14 | (2006.01) | |
| C10M 105/12 | (2006.01) | |
| C10M 105/70 | (2006.01) | |
| C08F 126/10 | (2006.01) | |
| C08B 1/00 | (2006.01) | |
| C08J 3/12 | (2006.01) | |
| C08J 3/14 | (2006.01) | |
| C08L 39/06 | (2006.01) | |
| C08L 33/02 | (2006.01) | |

(52) U.S. Cl.
CPC .............. *C08J 3/12* (2013.01); *Y10T 428/2982* (2013.01); *C08J 3/14* (2013.01); *C08L 39/06* (2013.01); *C08J 2301/02* (2013.01); *C08J 2339/06* (2013.01); *C08L 33/02* (2013.01)

(58) Field of Classification Search
USPC .......................................................... 428/402
IPC .. C08J 3/12,3/14, 3/122, 2339/06; C08L 39/06; C10L 1/182; C08F 120/06; C10M 105/12; C08B 1/00; A61K 2201/101
See application file for complete search history.

(56) References Cited

U.S. PATENT DOCUMENTS

| | | | | |
|---|---|---|---|---|
| 7,502,161 | B2 * | 3/2009 | Chopra et al. ................. | 359/296 |
| 7,652,656 | B2 * | 1/2010 | Chopra et al. ................. | 345/107 |
| 8,137,900 | B2 * | 3/2012 | Chopra et al. ................. | 430/321 |
| 2013/0109603 | A1 * | 5/2013 | Russo et al. ................... | 508/216 |

FOREIGN PATENT DOCUMENTS

| | | | |
|---|---|---|---|
| EP | 0555980 | * | 8/1993 |
| EP | 555980 | | 9/1993 |
| EP | 1437375 | | 7/2004 |
| EP | 1541634 | * | 6/2005 |
| JP | 2006/002047 | * | 1/2006 |
| JP | 2006002047 | | 1/2006 |

OTHER PUBLICATIONS

Written Opinion of the PCT/ISA for PCT/US2012/062407.

\* cited by examiner

*Primary Examiner* — Leszek Kiliman

(57) ABSTRACT

Micronized polymers suitable for use in fuels and lubricants having a particle size distribution of less than 30 microns obtained from water-soluble solid organic polymers is provided. A water-soluble solid organic polymer having a number average molecular weight in the range of 1000 to 200,000 is subjected to a molecular segmentation in a polar solvent in a polymer to solvent ratio in the range of 1:1 to 1:10 to produce a micronized polymer having a particle size distribution of less than 30 microns.

10 Claims, 2 Drawing Sheets

HYDROCARBON FLUID COMPATIBLE MICRONIZED POLYMERS

The present application claims the benefit of U.S. Patent Application No. 61/553,586, filed Oct. 31, 2011 the entire disclosure of which is hereby incorporated by reference.

FIELD OF THE INVENTION

The present invention relates to preparation of certain micronized polymers useful for use in fuels and lubricants and the micronized polymers prepared by such processes.

BACKGROUND OF THE INVENTION

Engine manufactures in developed countries are continuously challenged to improve the fuel economy and performance of vehicles in the market place. The original equipment manufacturers for vehicles are being pressured to meet and exceed the Environmental Protection Agency's Corporate Average Fuel Economy (CAFE) requirements as well to reduce the vehicles fuel consumption, which in turn would reduce the dependency on imported oil. CAFE is the sales weighted average fuel economy, expressed in miles per gallon (mpg), of a manufacturer's fleet of passenger cars or light trucks with a gross vehicle weight rating (GVWR) of 8,500 lbs. or less, manufactured for sale in the United States, for any given model year. Fuel economy is defined as the average mileage traveled by an automobile per gallon of gasoline (or equivalent amount of other fuel) consumed as measured in accordance with the testing and evaluation protocol set forth by the Environmental Protection Agency (EPA). Further it is important to ensure that any compounds included in such fuel or lubricants used in vehicles are compatible with the fuels and base oils in order for the fuel and lubricants to function with vehicles without negatively impacting its operability or performance.

For example, modern engine lubricating oil is a complex, highly engineered mixture, up to 20 percent of which may be special additives to enhance properties such as viscosity and stability and to reduce sludge formation and engine wear. For years antiwear additives for high-performance oils such as zinc dialkyldithiophosphate (ZDDP) has been used that work by forming a protective polyphosphate film on engine parts that reduces wear. This film, referred to as a tribofilm or antiwear film (such as polyphosphate, zinc phosphate, zinc sulfide and iron sulfide), is worn away as engine is operated.

SUMMARY OF THE INVENTION

In accordance with certain of its aspects, in one embodiment of the present invention provides a process for preparing a micronized polymer suitable for use hydrocarbon fluids such as fuels and lubricants comprising: (a) providing a water-soluble solid organic polymer having a number average molecular weight in the range of 1000 to 200,000 in a polar solvent in a polymer to solvent ratio in the range of 1:1 to 1:10 to provide a polymer-containing solution; (b) subjecting said polymer to a molecular segmentation to produce a micronized polymer having a particle size distribution of less than 30 microns.

In another embodiment, the present invention provides a micronized polymers prepared by such process, particularly micronized methyl celluloses, micronized N-vinyl pyrrolidone, and micronized poly(acrylic acid) having particle size distribution of less than 30 microns useful for as fuel components and lubricant components.

Hydrocarbon fluids comprising such micronized polymers are also provided.

DETAILED DESCRIPTION OF THE INVENTION

Figure 1:
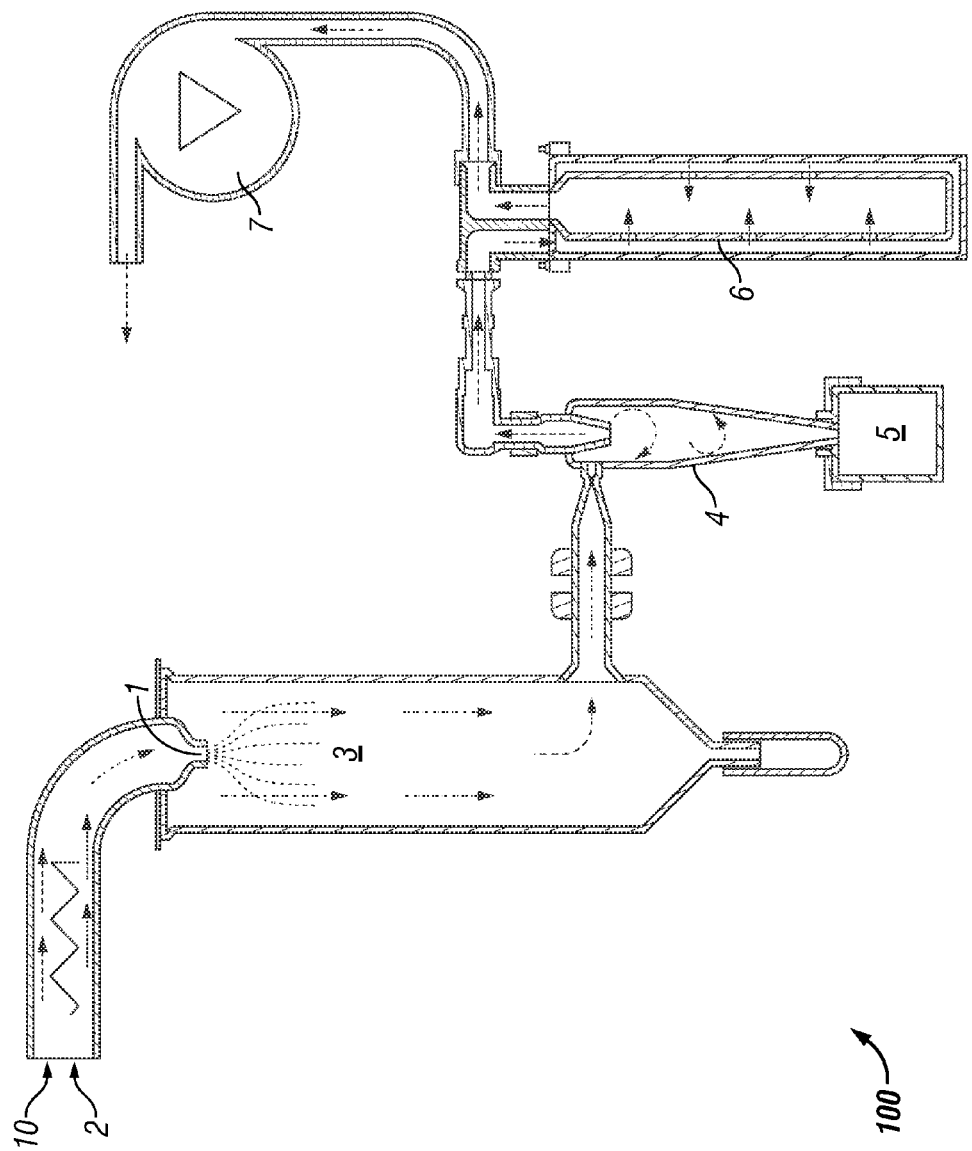
FIG. 1—This figure represents a schematic embodiment of a spray drying process to prepare the fuel compatible micronized polymer.
Figure 2:
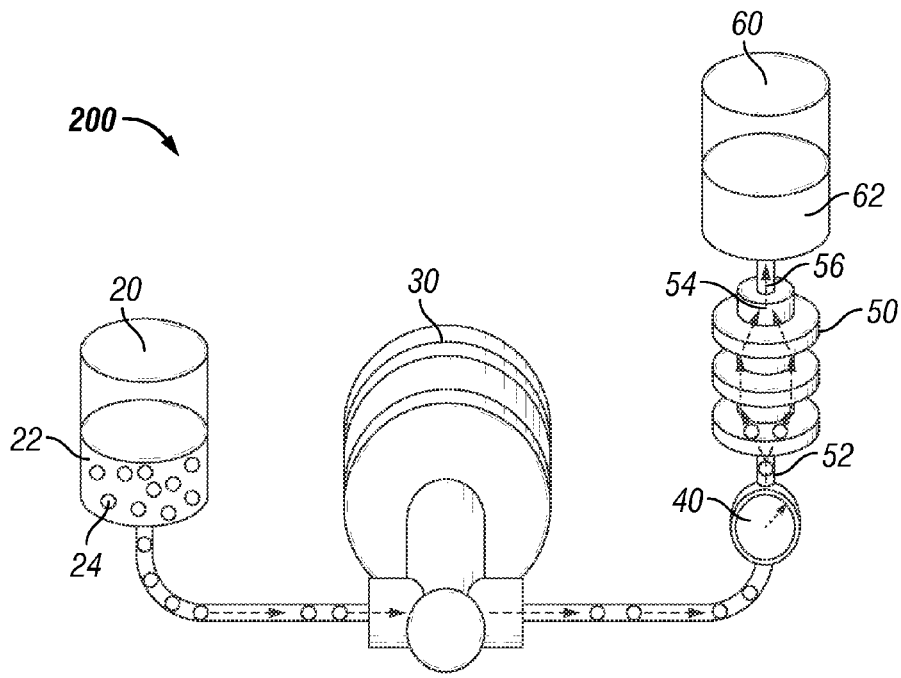
FIG. 2—This figure represents a schematic embodiment of a sonification process to prepare the fuel compatible micronized polymer.

We have found that by subjecting certain solid water soluble polymers to molecular segmentation, a micronized polymer that can be readily dispersed in hydrocarbon fluids, such as fuels and lubricants, is obtained.

Commercial solid water soluble polymers typically have in average a particle size distribution of 36 microns or larger. Solid water soluble polymers are commercially available from Dow Chemical Company, Polysciences, Inc, and Sigma-Aldrich Co. LLC and others. It has been found that micronizing water soluble solid organic polymers such as the methyl cellulose to a Sauter mean diameter of less than 30 microns, preferably less than 25 microns, more preferably less than 20 microns, most preferably less than 15 microns, the micronized methyl cellulose provide polymers dispersable in hydrocarbon fluids such as lubricants and fuels. Typically, the micronized polymers have a particle size distribution in the range of 0.1-30 microns, preferably have a particle size distribution in the range of about 0.5 to about 25 microns.

The particle size distribution is given herein by the Sauter mean diameter. The Sauter mean diameter is a measure of the mean particle size per unit surface area. The Sauter mean diameter (also noted as $d_{32}$) may be calculated from the surface area ($A_p$) and volume ($V_p$) of a particle, according to the formula:

$$D_{32} = 6 * (V_p/A_p)$$

Suitable water-soluble solid organic polymer typically have a number average molecular weight of at least 1000, preferably at least 1500, more preferably at least 2000, to at most 200,000, more preferably to at most 150,000. In some embodiments, depending on the applications and/or specific polymers, smaller average molecular weight polymers may be preferred, such as having an upper number average molecular weight of 50,000 or less, 30,000 or less, 25,000 or less, even 20,000 or less, and may have the lower limit number average molecular weight of 1000 or more, 1500 or more, or 2000 or more. Examples of water-soluble solid organic polymers include, for example, methyl cellulose, poly(N-vinyl pyrrolidone), and poly (acrylic acid)

Water solubility is defined as having a hydrophilic/lipophilic balance (HLB) equal to seven or greater. The HLB is determined by calculating values for different parts of the molecule, according to the following equation:

$$HLB = 20 * M_h/M$$

Where $M_h$ is the molecular weight of the hydrophilic portion of the molecule and M is the molecular mass of the whole molecule.

Suitable polar solvents are water, oxygenated solvents having 1-8 carbon atoms, preferably C1-C4 alcohols, such as for example, methanol, ethanol, propanol, and butanol, C2-C5 ketones, such as for example, methyl ethyl ketone and acetone, C4-C8 ethers such as for example, diethyl ether, dipropyl ether, and dibutyl ether, C2-C5 acids such as for example, acetic acid, ethanoic acid, propionic acid, butanoic acid, and C3-C7 esters such as for example, methyl ethanoate, ethyl ethanoate, butyl ethanoate, methyl propanoate, butyl propanoate and propyl butanoate.

A process where polymer aggregates are de-entangled via processing is referred to as "Molecular Segmentation". Molecular Segmentation is a process which increases the critical entropy energy of the polymer aggregate by intrapenetrating the polymer aggregate matrix and generating/developing a simpler singular Methyl Cellulose polymer. This process generates a smaller particle size without degrading the polymers molecular weight. Molecular Segmentation can be generated in a number of ways such as thermally, vibrationally or chemically to name a few.

Examples of methods that can be used for molecular segmentation include spray drying, microfluidization, sonification, pan coating, air suspension coating, centrifugal extrusion, vibrational nozzle, ionotropic gelation, coacervation, interfacial polycondensation, interfacial crosslinking, in-situ polymerization, electrospinning and matrix polymerization As an example, FIG. 1 is a process flow diagram of one embodiment of a process to prepare fuel compatible micrnonized polymers. A process flow diagram of another embodiment is illustrated in FIG. 2.

In reference to FIG. 1, in a schematic flow diagram of one embodiment of the invention process 100, the solution containing water-soluble organic polymer 10 and drying medium 2 are introduced to a two-fluid nozzle 1 that is operated by compressed air to disperse the solution containing water-soluble solid organic polymer 10 into fine droplets to provide a droplet containing micronized polymer. The drying medium 2 (e.g., air) may be electric heated and introduced. The fine droplets are dried to solid particles in the spray cylinder 3 forming solid particles. The solid particles are separated in the cyclone 4, to fine solid particles in the collection vessel 5 and finer separated solid particles which are passed to the outlet filter to remove the finer solid particles onto the filter 6, while flow is generated by an aspirator 7. The solid dried micronized particles are collected from 5 and 6 (lighter particles that cannot be separated in the cyclone)

In reference to FIG. 2, in a schematic flow diagram of one embodiment of the invention process 200, the solution 22 containing water-soluble organic polymer 24 is provided to an inlet reservoir 20 where the starting emulsion/dispersion is provided. The starting emulsion/dispersion is then pass through a high pressure intensifier pump 30 to generate high pressures required for homogenization (typical pressure range of about 5,000 to about 40,000 psi) thereby generating a high pressure solution stream. The high pressure solution stream is typically monitored by a pressure gauge or transducer 40 to set pressure (typically up to 40,000 psi). The high pressure solution stream is then introduced to the interaction chamber 50 where the polymer is subjected to molecular segmentation by splitting the high pressure solution stream 52 to a first high pressure split stream (52A) and second high pressure split stream (52B) then combining the first and second high pressure split stream at 54 to generate molecular segmentation to produce a micronized polymer stream 56. The micronized polymer stream is then collected 62 at the outlet reservoir 60. Solution is removed from the collected micronized polymer stream to obtain the micronized polymer.

The water-soluble solid organic polymer subjected to a molecular segementaion process produces a micronized polymer compatible with hydrocarbon fluids such as fuels and lubricants. Such micronized polymer have particle size distribution of less than 20 microns, preferably less than 25 microns, more preferably less than 20 microns, even more preferably less than 15 microns, and have a number average molecular weight of at least 1000, preferably at least 1500, more preferably at least 2000, to at most 200,000, more preferably to at most 150,000. In some embodiments, depending on the applications and/or specific polymers, smaller average molecular weight polymers may be preferred, such as having an upper number average molecular weight of 50,000 or less, 30,000 or less, 25,000 or less, even 20,000 or less, and may have the lower limit number average molecular weight of 1000 or more, 1500 or more, or 2000 or more. Examples of such micronized polymers include, for example, micronized methyl cellulose, micronized poly(N-vinyl pyrrolidone), and micronized poly (acrylic acid). The micronized polymer may have a particle size distribution of at least 0.1 microns, preferably at least 0.5 microns.

It was found that while the non-micronized polymer does not readily disperse in hydrocarbon fluids, the micronized polymer readily disperses in such hydrocarbon fluids. As such hydrocarbon fluids, such as fuels and lubricants, containing the micronized polymer dispersed in the hydrocarbon fluids may be obtained. The primary method used to assess dispersion stability is zeta potential. The zeta potential is the potential difference between the dispersing medium and the stationary layer of fluid interacting with the dispersed particle. The significance of zeta potential is that this value can be related to the stability of colloidal dispersions. The zeta potential indicates the degree of repulsion between adjacent, similarly charged particles in a dispersion. Colloids with high zeta potentials are electrically stabilized, and will resist aggregation, while colloids with low zeta potentials will coagulate or flocculate. This is especially important in fuel and lubricant applications, as polar polymers are not soluble in these media. Therefore, micronization may be employed to improve the stability of adding these materials to fuels and lubricants, and the degree of improvement may be monitored by zeta potential.

Generally, the micronized polymers are added to a hydrocarbon fluid in an amount in the range from about 0.001% by weight, to about 10% by weight based on the total weight of the hydrocarbon fluid to produce the hydrocarbon fluid containing the micronized polymer. The amount of the micronized polymers added may vary based on the application and/or the specific micronized polymer. In some embodiment depending on the application and/or the micronized polymer, an amount in the range from about 0.01% by weight to about 1% by weight, based on the hydrocarbon fluid may be added to produce the hydrocarbon fluid containing the micronized polymer.

While the invention is susceptible to various modifications and alternative forms, specific embodiments thereof are shown by way of examples herein described in detail. It should be understood, that the detailed description thereto are not intended to limit the invention to the particular form disclosed, but on the contrary, the intention is to cover all modifications, equivalents and alternatives falling within the spirit and scope of the present invention as defined by the appended claims. The present invention will be illustrated by the following illustrative embodiment, which is provided for illustration only and is not to be construed as limiting the claimed invention in any way.

Illustrative Embodiment

Test Methods

Average Particle Counting

The particle sizes were determined using a laser-based particle counting/sizing system developed by Spectrex Corporation, model PC-2200. This system uses a laser diode operating at 650 nm to achieve particle counting and sizing through the scattering of the resultant light. The light is focused onto a 2 cm segment of the sample stream, and the photodetector is positioned to measure light scatter in the near-forward direction of the sample over an angle between 4° and 19°. The photodetector is gated to only allow sizing of in-focus particles, as out of focus particles will produce broadened pulses, which can be removed from the analysis. Typical accuracy of a single pass counting/sizing run is +/−15%, which can be minimized further through successive runs. The samples were measured as dispersions in toluene, with an opacity below 30%.

Average Particle Size (Particle Size Distribution)

A Malvern Mastersizer 2000 outfitted with a Sirocco dry powder accessory was used for the determination of average particle size. An adequate amount of sample is placed within the Sirocco accessory, and the material is then fed into the measuring unit (Mastersizer 2000) using an ultrasonics setting of approximately 50% (to provide a reasonable material feed rate). The critical parameter to be adjusted during this measurement is the air pressure. Since water-soluble polymers absorb moisture well, they often agglomerate easily when not dispersed in a solvent. Therefore, air is used to assist in breaking up these agglomerations. The air pressure is titrated to provide the best measurement conditions. To compare micronized polymer with the commercial starting material, the Sauter mean diameter is used.

Density (ASTM D70)

The density of the solid was measured using a calibrated pycnometer. The pycnometer and sample are weighed, then the remaining volume is filled with helium. The filled pycnometer is brought to the test temperature, weighed. The density of the sample is calculated from its mass and the mass of helium displaced by the sample in the filled pycnometer.

Zeta Potential

The Malvern Nano-Z is designed to measure zeta potential using laser light scattering. The process involves placing a sample of appropriate concentration (0.1% to 15%, depending on the light absorbance characteristics of the material) in a "dip cell", which consists of a cuvette equipped with electrodes to place a potential across the sample. The instrument is automated with respect to the measurement process, and self-adjusts the settings to optimize the results. The zeta potential was measured in water.

Molecular Weight

A gel permeation chromatograph (GPC) was used to determine the molecular weight of each sample. Calibration was achieved using dextran/pullulan standards. The eluent was 0.1M sodium nitrate in water or 0.1M sodium nitrate in water with 20% methanol. The precolumn was a PSS Suprema 10 micron, 30 Å, ID 8×50 mm. Three columns were used: PSS Suprema 10 micron, 100 Å, ID 8×300 mm, PSS Suprema 7 micron, 300 Å, ID 8×300 mm, and PSS Suprema 10 micron, 1000 Å, ID 8×300 mm. The flow rate was 1.0 mL/min. The sample concentration was 2.0 g/L and the measurement temperature was 23° C. Detection was provided by PSS SECcurity UV-VIS @ 230 nm and PSS SECcurity RID. Calculations were performed using PSS WinGPC Unity Ver. 8.0 software.

Molecular Segmentation Process

Micronized methyl celluloses were prepared using Methocel E4M and A15LV premium hydroxylpropyl methylcellulose obtained from Dow Chemical Company. Micronized poly (N-vinyl pyrrolidone) were prepared using poly (N-vinyl pyrrolidone) obtained from Polysciences, Inc. Micronized poly(acrylic acid) were prepared using poly(acrylic acid) obtained from Sigma-Aldrich Co. LLC.

Spray Dry Method.

The micronized polymers were prepared using Buchi Model B-290 Spray Drier under the following conditions.

Solution Preparation: a 3% polymer/DI water solution is left to stir overnight.

| Spray Dyer Settings: | Buchi B-290 |
|---|---|
| Temperature: | 110° C. |
| Aspirator: | 100% |
| Air Flow: | 600 L/hr |
| Pump Rate: | 35% |

Once the inlet temperature reaches the set temperature (110° C.), the polymer/water solution is fed at a 35% pump rate. Once all the solution has been dried, the receiving container is opened and the dried final product is then collected.

The Sauter mean diameter of the methyl cellulose before and after the micronization process, measured according to the test method described above, is provided below (in microns).

| Commercial Methyl Cellulose: | 59.4 |
|---|---|
| Micronized Methyl Cellulose | 7.5 |

Figure 3:
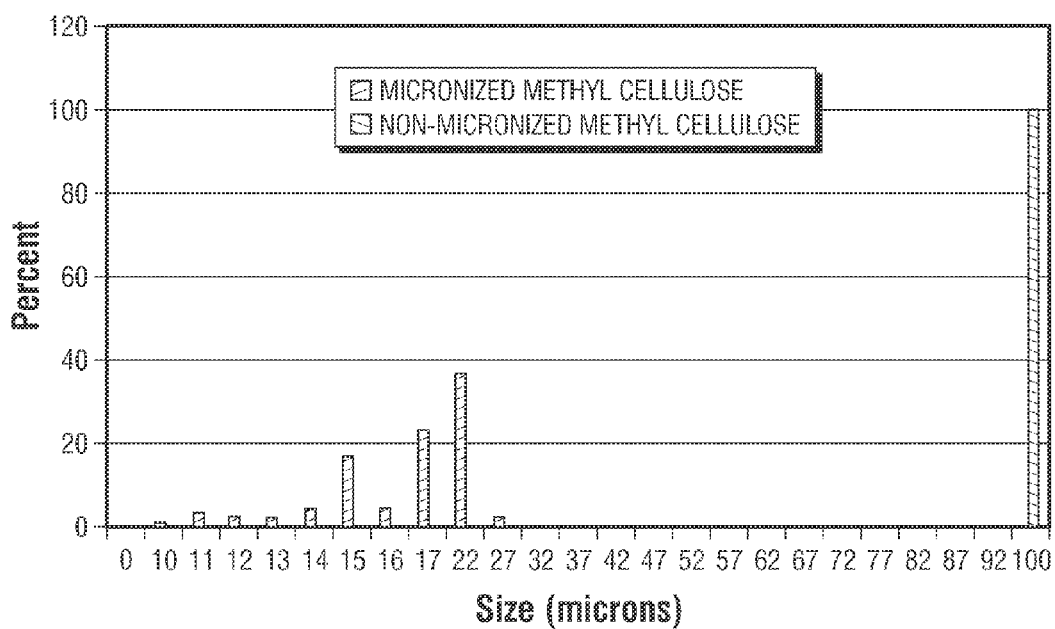
FIG. 3—This figure represents the particle counting determination between the commercial Methyl Cellulose and the micronized methylcellulose in toluene.

FIG. 3 show that the micronization process reduces the size of the particles of the commercial Methyl Cellulose from 100 microns to below 30 microns in size in toluene solution by particle counting.

The density of the methyl cellulose before and after the micronization process measured, according to the method described above, is provided below.

| Commercial Methyl Cellulose | 1.456 g/cm$^3$ |
|---|---|
| Micronized Methyl Cellulose | 1.6802 g/cm$^3$ |

The molecular weight of the polymer remains substantially unchanged, as shown below for methylcellulose.

| Commercial Methyl Cellulose | 154,000 g/mol (20% MeOH), 135,000 g/mol (no MeOH) |
|---|---|
| Micronized Methyl Cellulose | 143,000 g/mol (20% MeOH) 143,000 g/mol (no MeOH) |

The properties of the starting water-soluble solid organic polymers and the micronized solid organic polymers prepared according to the method above are provided below in Table 1.

TABLE 1

| Sample | Sauter Mean Diameter (microns) | Surface Area ($m^2/g$) | Zeta Potential (mV) | Density (g/cm3) | Volume (cm3) | HLB | MW |
|---|---|---|---|---|---|---|---|
| poly(N-vinyl pyrrolidone) | 36.3 | 0.116 | −6.51 | 1.2197 | 1.0333 | 17.7 | 3,780 |
| micronized poly(N-vinyl pyrrolidone) | 10.2 | 0.415 | −9.73 | 1.2271 | 1.0185 | 17.7 | 3,450 |
| poly(acrylic acid) | 78.7 | 0.0725 | −3.39 | 1.3965 | 0.4793 | 12 | 13,800 |
| micronized poly(acrylic acid) | 6.2 | 0.916 | −13.8 | 1.431 | 0.5012 | 12 | 14,000 |
| methyl cellulose | 59.4 | 0.0998 | −4.58 | 1.456 | 0.3422 | 18 | 154,000 |
| micronized methyl cellulose | 7.5 | 0.789 | −7.3 | 1.6802 | 0.1084 | 18 | 143,000 |

Microfluidization Method

The micronized polymers were prepared using Microfluidics M-110P microfluidizer under the following conditions.

Solution Preparation:

0.1%-3% polymer/DI water/hydrocarbon mixture (55%-99% xylenes)/0.1%-15% (based on total volume) surfactant. (The hydrocarbon preferably has a boiling point greater than 100° C.)

Emulsion Preparation Process a. the polymer/DI water and surfactant mixture is processed through a Ross mixer (or similar) for 3-4 minutes at low speed (500-4,000 RPM).

b. The preprocess mixture is added to a hydrocarbon. The amount of hydrocarbon is greater than the amount of DI water added. The resulting solution is once again processed in the Ross mixer for 5-8 minutes at low to moderate speed (1,000-5,000 RPM).

c. The resulting polymer/DI water/surfactant and hydrocarbon emulsion is processed 1 or more times via the microfluidics equipment to achieve the desired droplet size, this is typically accomplished in 3 passes.

d. The final stage of the process is to dry the final polymer/DI water/surfactant/hydrocarbon blend in a rotary-evaporator (or other solvent removal method, such as freeze-drying) to remove the water and hydrocarbon to produce a very fine powder. (removal of the hydrocarbon solvent is optional)

What is claimed is:

1. A micronized poly (acrylic acid) having number average molecular weight in the range of 1000 to 200,000 and a particle size distribution of less than 30 microns.

2. The micronized poly (acrylic acid) of claim 1 wherein the particle size distribution is 20 microns or less.

3. The micronized of claim 1 wherein the particle size distribution is 15 microns or less.

4. A hydrocarbon fluid comprising a micronized polymer of a water-soluble solid organic polymer having number average molecular weight in the range of 1000 to 200,000 and a particle size distribution of less than 30 microns.

5. The hydrocarbon fluid of claim 4 wherein micronized polymer is a micronized methyl cellulose.

6. The hydrocarbon fluid of claim 4 wherein the micronized polymer is a micronized N-vinyl pyrrolidone.

7. The hydrocarbon fluid of claim 4 wherein the micronized polymer is a micronized poly (acrylic acid).

8. The hydrocarbon fluid of claim 4 wherein the particle size distribution of the water-soluble solid organic polymer is 25 microns or less.

9. The hydrocarbon fluid of claim 4 wherein the particle size distribution of the water-soluble solid organic polymer is 20 microns or less.

10. The micronized polymer of claim 4 wherein the particle size distribution of the water-soluble solid organic polymer is 15 microns or less.

* * * * *